Aug. 21, 1973   H. A. K. KRAUTH ET AL   3,753,854
PRODUCTION OF A FUEL CARBIDE WITH A JACKET OF FUEL
NITRIDE, SULFIDE OR PHOSPHIDE
Filed June 15, 1970
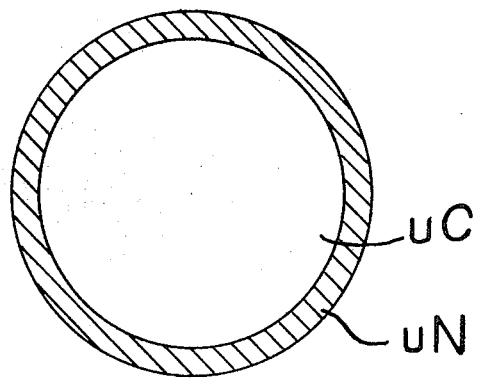
INVENTORS
HORST A. K. KRAUTH
NORBERT MÜLLER
PAUL HIMMELSTEIN
BY
Cushman, Darby & Cushman
ATTORNEYS

3,753,854
PRODUCTION OF A FUEL CARBIDE WITH A JACKET OF FUEL NITRIDE, SULFIDE OR PHOSPHIDE

Horst Axel Karl Krauth, Wurzburg, Norbert Müller, Wolfgang, near Hanau am Main, and Paul Himmelstein, Frankfurt am Main, Germany, assignors to Nukem Nuklear-Chemie und-Metallurgie, G.m.b.H., Wolfgang near Hanau, Germany
Filed June 15, 1970, Ser. No. 46,171
Int. Cl. G21c 3/02, 21/00
U.S. Cl. 176—67                                8 Claims

ABSTRACT OF THE DISCLOSURE

Nuclear fuel particles are prepared by forming a jacket of 1 to 10 µm thick of uranium, plutonium or thorium nitride, sulfide or phosphide on fuel carbide particles having a size between 0.01 and 2 mm.

---

As it is known, fuel oxides are placed or charged into most nuclear reactors. In spite of good corrosion resistance and high temperature stability (melting point 2850° C.) this fuel is not too well suited for certain reactor concepts. This is especially true in all of those cases in which a high power density in the fuel rod becomes necessary such as, for example, in rapid breeders or in rapid highflow graphite reactors. In these cases the impaired thermal conductivity of the $UO_2$ has a deleterious effect. In the search for more suitable fuels the fuel mono carbide with its high thermal conductivity and its nevertheless relatively high melting point of 2400° C. appears to be especially suitable. However, high susceptibility with regard to corrosion, for example, by water, precludes the carbide as a fuel when the cooling system uses water or steam. Additionally this property makes the production of the carbide fuel much more difficult and thus, more expensive, since the operations have to be conducted, to a large extent, in box systems with an extremely pure atmosphere. It is specifically very difficult to introduce or fill carbide fuel into encasing jackets and at the same time maintain the content of adsorbed gases and oxides at the surface of the fuel at a low level. This is especially true if, as in the rapid breeders, only a lower density of the fuel between 80 and 90% of the theoretical maximum density is permissible and therewith a fuel is presented having a higher specific surface area either in the form of porous sintered elements or of particles compressed by vibration.

For these reasons the fuel monocarbide until now has not been widely distributed or used, although it has been known for many years and has been produced in amounts of many tons for special uses and purposes.

In addition there are generally known experiments for the production of a uranium carbonitride by addition, for example, of nitrogen which is more stabile against corrosive attack. This has led to quite a success in nitrogen to carbon ratios of about 1:4 and higher. However, this amount of nitrogen when looking at the physical aspects of neutrons is possibly much too high for the reactor concepts that would conceivably be considered.

The present invention, however, makes it possible to maintain the stabilizing effect of foreign additives such as, for example, nitrogen by using them in such small amounts that they are still permissible and acceptable physically with regard to the neutrons. This is accomplished by placing the foreign additives in the manner of a jacket around the small carbide particles or grains which, to a large extent, protects the carbide from outside influences.

As the most important additives, there are employed nitrogen, sulfur or phosphorus. These materials as fuel nitrides, sulfides and phosphides form unbroken mixed crystals with the monocarbides whereby it is additionally also possible to produce a single phase nuclear fuel in the form of a modified monocarbide which promises an especially favorable reactor behavior. There can be formed UC, PuC and ThC and mixtures thereof. Thus there can be formed mixed uranium monocarbide and plutonium monocarbide mixed crystals with uranium nitride, uranium sulfide, uranium phosphide, plutonium nitride, plutonium sulfide and plutonium phosphide. The function of the jacket layer of, for example, fuel nitride in this instance is not for the prevention of fission gas escape as is known with so-called "coated particles." The fuel which has been encased in a jacket according to the invention has on the contrary the advantage that there is obtained with a very low nitrogen sulfur or phosphorous content not only a stabilizing effect against water and oxygen but also a single phase fuel. The content of the additive elements can amount to less than 1% by weight, e.g. 0.4 to 0.5% by weight. The thickness of the protective layer can amount to between 2 and 20 µm.

The single figure of the drawings illustrates a structure of the carbide nucleus treated according to the invention wherein, for example, uranium carbide 2 is encased or jacketed by uranium nitride 4.

The fuel carbide provided with a layer of nitride, sulfide or phosphide can be produced in various forms.

An interesting variation of the fuel is sintered carbide elements in which the individual crystal-like grains of fuel monocarbide are surrounded, for example, by a nitride jacket. The nitride phase can either be produced in the carbide directly after its production (Example 1) or it can be applied at the end of the sintering process by nitriding of the metal phase that has been produced so far (Example 2).

A second variation of the fuel is jacketed carbide particles wherein the jacket again can be produced out of fuel nitride, sulfide or phosphide. When the fractions of the particle are selected in the proper dimensions, then this fuel becomes suitable for the process of compressing the same in the encasing jackets by means of vibration. Different processes can be employed for the production of the particles. For example, under stoichiometric carbide particles which have undergone a reaction and which contain a metal phase that lies, preferably on the particle surface, can be subjected to an annealing treatment and at the conclusion of this annealing treatment the metal phase for example can be nitrided in the gas stream as shown in Example 3. In this variation the particle density lies considerably below the theoretical maximum density. The nitride jacket in most circumstances does not completely surround or enclose the carbide nucleus.

If, for example, high quality is demanded of the particles with regard to the density and the corrosion resistance it is recommended that the reacted particles be melted, Example 4, and if need be even coated with an additional metal and/or nitride layer as shown in Example 5.

The third variation or type of fuel that is interesting is pressed fuel elements of carbide in which the individual carbide particles of which the said pressed elements consist, are again surrounded with a nitride jacket, etc. Several variations can be obtained by the production of said particles. There are produced particles coated, for example, with a nitride layer and then pressed to objects which can be supplied to the jacket tubes without subsequent sintering. In one variation of this process a below stoichiometric fuel monocarbide with a metal content of preferably 1–10% by weight is produced from a mixture of fuel oxide and carbon in known way, the reaction product broken, ground, annealed at a temperature around or above the melting point of the metal phase and then the metal phase is nitrided, phosphided or sulfided in a gas stream. In a second variant the under-stoichiometric fuel monocarbide after being broken is melted. The melt regulus broken, ground and the resulting particles of between 1 μm. and 1 mm. diameter finally annealed at a temperature around or above the melting point of the metal phase and then this metal phase nitrided, phosphided or sulfided in the gas stream. In a third variant an essentially stoichiometric monocarbide produced from a mixture of fuel oxide and carbide is melted, the melt regulus broken and ground, the particles thus obtained are next coated in a fluidized bed at a temperature between 600° C. and 800° C. with fuel metal which then is changed in a nitrogen, hydrogen sulfide or phosphine atmosphere at temperatures between 700° C. and 1800° C. into a fuel nitride, sulfide or phosphide layer.

On the other hand, the particles produced by any of the three variations just mentioned before nitriding or the like, can be jacketed by the metal phase, pressed into shaped fuel elements and then for the first time the metal phase nitrided, etc. as shown in Example 7.

EXAMPLE 1

(U, Pu)$O_2$ (containing 15% Pu by weight) was reacted with carbon by a known process to (U, Pu)C wherein the proportions of the starting materials were so formulated that there was produced an under stoichiometric, porous product with a metal content of about 5%. The metallic phase was then nitrided in a nitrogen gas stream in a multiphase process at temperatures between 700° C. and 1800° C. Then the carbide was ground, pressed at molding pressures between 1 and 5 metric tons/cm.$^2$, e.g. 1.5 metric tons/cm.$^2$ to briquettes having between 40 and 60% of the theoretical density and sintered in a slightly reducing atmosphere (Ar+5% $H_2$), at about 1700° C. (Sintering temperatures between 1400° C. and 2200° C. can be used in the sintering step.)

EXAMPLE 2

Under stoichiometric (U, Pu)C containing 15% Pu by weight was produced as in Example 1, subsequently ground and the powder obtained pressed at pressures between 0.5 and 3 metric tons/cm.$^2$ to briquettes having about 50% of the theoretical density and finally sintered in a neutral or slightly reducing atmosphere at 1500° C. (Temperatures between 1200° C. and 1800° C. can be employed.) The pressing and sintering procedures in this particular example were assisted by the presence of the metallic phase. The sintering temperature was considerably lowered by the "sintering in liquid phase." Toward the end of the sintering the metal, which is preferably present on the grain boundaries 14, is nitrided in a $N_2$ stream between 700° C. and 1800° C.

EXAMPLE 3

$UO_2$ was reacted with carbon according to a known process to UC wherein the proportions of the starting materials were so adjusted that an under stoichiometric, porous product was formed with a metal content of 2.0% by weight (the metal content can range between 1 and 10% by weight). The carbide was broken up and divided into the following vibratable granule fractions:

| | Percent |
|---|---|
| Coarse fraction: 0.8–2.0 mm. | 60 |
| Middle fraction: 0.5–0.2 mm. | 15 |
| Fine fraction: <0.1 mm. | 25 |

The particles were then annealed around or above the melting point of the metal phase, preferably at 1200° C. in order to distribute the metal approximately equally across the carbide granules. After the annealing treatment in vacuum or an inert atmosphere, e.g. argon, the particles were nitrided in a nitrogen stream at 700 to 1800° C. This made them very stable against water and oxygen corrosion.

EXAMPLE 4

Under stoichiometric UC was produced as in Example 3, subsequently melted in an electric arc furnace, broken up and ground and thereafter surrounded with a nitride layer as in Example 3.

EXAMPLE 5

Molten, nearly stoichiometric (U, Pu)C having 15% by weight PuC was ground and divided into vibratable fractions. The individual fractions were separated from each other and placed in a fluidized bed under a protective gas (argon) atmosphere and covered with a (U, Pu) metal layer at temperatures between 600° C. and 800° C. This layer was then nitrided under nitrogen between 700° C. and 1800° C.

EXAMPLE 6

Carbide particles were produced as in Examples 3, 4 and 5. However, a continuous particle spectrum of <1.2 mm. was sufficient. The particles were subsequently pressed at molding pressures of 5 metric tons/cm.$^2$. They can be employed as nuclear fuel without separate sintering. The molding pressure can be between 2 and 10 metric tons/cm.$^2$.

EXAMPLE 7

Carbide particles were produced as in Examples 3, 4 and 5. These particles, however, before the nitriding were pressed to molded elements at molding pressures between 1 and 5 metric tons/cm.$^2$. The fuel metal served as an aid in the pressing and yielded an especially shape stable briquette. At the conclusion the briquettes were annealed in a nitrogen stream between 700° C. and 1800° C. and the metal phase nitrided during this process.

In similar fashion the metal phase can be sulfided by using hydrogen sulfide or phosphided by using phosphine.

The uranium, plutonium and thorium monocarbides (or mixtures thereof) have a particle size between 0.01 and 2 mm. and a jacket 1 to 10 μm. thick of the fuel nitride, sulfide or phosphide.

The sintered articles are preferably of cylindrical form, such as the briquettes set forth previously.

What is claimed is:

1. A nuclear fuel comprising individual fuel particles having an outer jacket thereon, wherein said fuel is a monocarbide of uranium, plutonium, thorium or mixtures thereof and said jacket is a nitride, sulfide or phosphide of uranium, plutonium, thorium, or mixtures thereof with the size of said particles being between 0.01 and 2 mm. and the outer jacket on said particles having a thickness of 1 to 20 microns.

2. A nuclear fuel according to claim 1 wherein the carbide particles are individual crystalline granules surrounded by said jacket.

3. A carbide nuclear fuel according to claim 2 wherein the granules are cylindrical.

4. A carbide nuclear fuel according to claim 1, wherein the jacket is fuel nitride.

5. A carbide nuclear fuel according to claim 1, wherein the jacket is fuel sulfide.

6. A carbide nuclear fuel according to claim 1, wherein the jacket is fuel phosphide.

7. A carbide nuclear fuel according to claim 1, wherein the jacket is 1 to 10μ microns.

8. A carbide nuclear fuel according to claim 1, wherein the jacket is 2 to 20 microns thick.

References Cited

UNITED STATES PATENTS

| | | | |
|---|---|---|---|
| 3,276,968 | 10/1966 | Ingleby | 176—67 X |
| 3,312,597 | 4/1967 | Glueckauf | 176—9 SP |
| 3,212,989 | 10/1965 | Fitzer et al. | 176—71 |
| 3,290,223 | 12/1966 | Blocker et al. | 176—91 |
| Re. 26,294 | 11/1967 | Sowman | 176—91 SP |
| 3,413,195 | 11/1968 | Boettcher | 176—91 R |
| 3,340,201 | 9/1967 | Kirchner | 252—301.1 R |
| 3,362,914 | 1/1968 | Kruger et al. | 264—0.5 |
| 3,579,390 | 5/1971 | Paine et al. | 264—0.5 |

FOREIGN PATENTS 597,925 5/1960 Canada _____ 176—89

ROGER S. GAITHER, Primary Examiner

U.S. Cl. X.R.

176—91 R, 91 SP; 252—301.1 R; 264—0.5